Nov. 19, 1957
H. D. LYONS ET AL
2,813,905
PROCESS FOR RECOVERING CYCLOHEXANONE
BY FORMATION OF A BISULFITE ADDUCT
Filed June 6, 1955
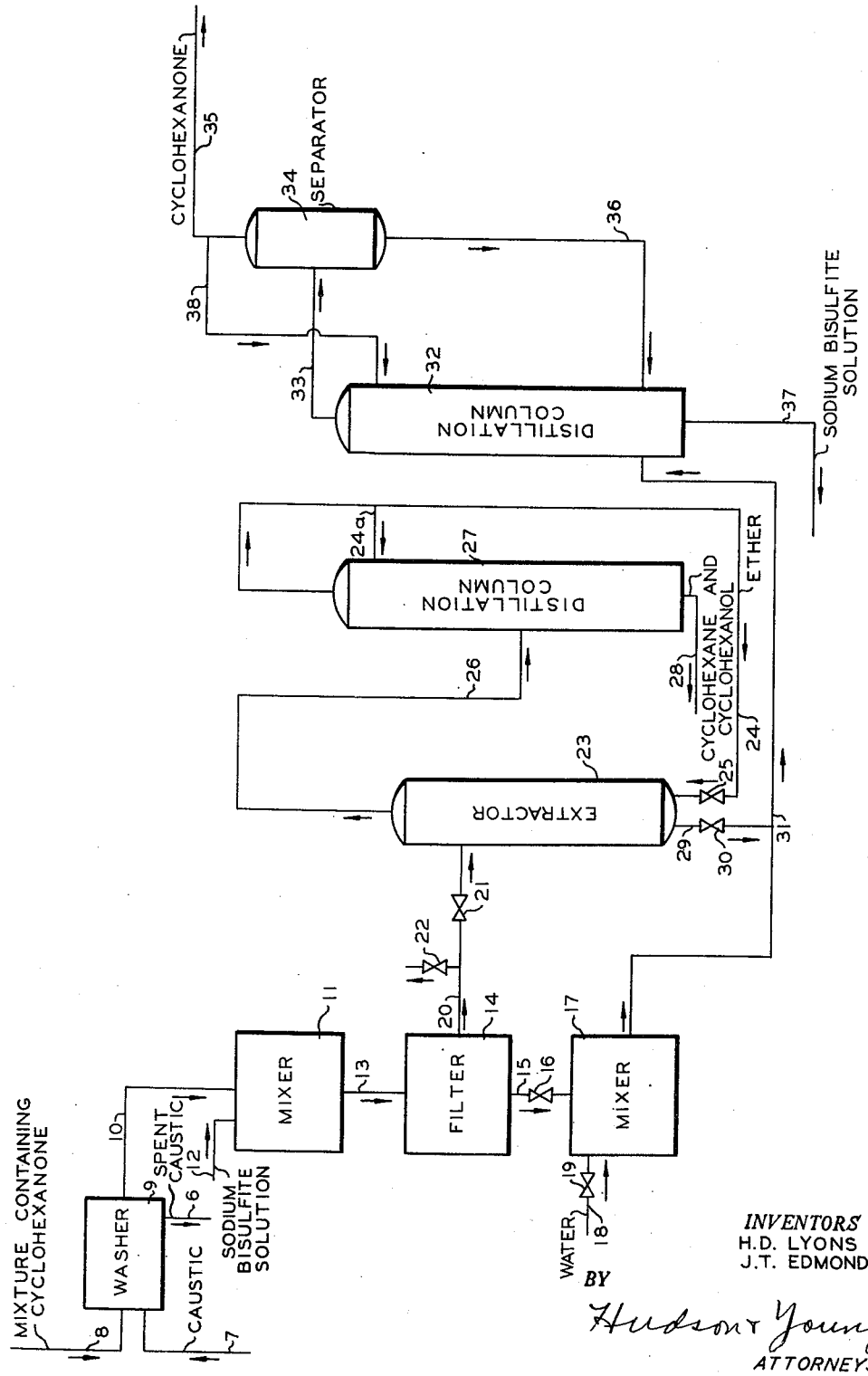
INVENTORS
H. D. LYONS
J. T. EDMONDS
BY
*Hudson & Young*
ATTORNEYS

United States Patent Office 2,813,905
Patented Nov. 19, 1957

2,813,905
PROCESS FOR RECOVERING CYCLOHEXANONE BY FORMATION OF A BISULFITE ADDUCT

Harold D. Lyons and James T. Edmonds, Jr., Bartlesville, Okla., assignors to Phillips Petroleum Company, a corporation of Delaware Application June 6, 1955, Serial No. 513,516

7 Claims. (Cl. 260—586)

This invention relates to the recovery of cyclohexanone. In one of its aspects the invention relates to the recovery of a substantially pure cyclohexanone by forming a cyclohexanone-bisulfite adduct. In another of its aspects the invention relates to the recovery of a substantially pure cyclohexanone by subjecting to distillation at a temperature in excess of about 90° C., a cyclohexanone-adduct, in the presence of water, and recovering a cyclohexanone-water azeotrope. In another aspect of the invention it relates to the formation of cyclohexanone-bisulfite adducts employing certain bisulfite solutions of concentrations which will yield, as desired, either a solution containing a dissolved adduct or a mixture containing a solution of dissolved adduct and some solid adduct, as desired.

Other aspects, the objects as well as the several advantages of this invention are apparent from a perusal of this disclosure, the drawing, and the appended claims.

Among the objects of the present invention is the recovery of substantially pure cyclohexanone, especially from the reaction mixture obtained by oxidation of cyclohexane; said reaction mixture containing cyclohexanone, cyclohexanol, and unreacted cyclohexane. An additional object is to avoid the use of large quantities of treating medium which have been required heretofore.

Cyclohexanone, widely used in the synthesis of caprolactam, is most readily prepared by the oxidation of cyclohexane. Along with the cyclohexanone, large quantities of cyclohexanol are produced by this process. Although mixtures of cyclohexanol and cyclohexanone can be utilized in the production of caprolactam from the cyclohexanone, it is most advantageous to separate the cyclohexanone from the cyclohexanol. This separation of cyclohexanone from mixtures of cyclohexanone, cyclohexanol, cyclohexane and other alicyclic hydrocarbons, organic acids, and other oxidation products, has remained one of the major operating difficulties in the large scale production of cyclohexanone and ultimately, caprolactam.

One of the common methods which has been used in the past to separate ketones has been to form the bisulfite adduct of the ketone and to subsequently decompose this adduct by treatment with an acid or a base to regenerate the ketone. A major disadvantage to the use of this method in commercial production of cyclohexanone is that large quantities of the basic or acidic material are required and this material cannot be recovered.

It is now discovered that the bisulfite adduct of cyclohexanone breaks down in water at approximately 93° C., at one atmosphere pressure and that the adduct components can be separated effectively to yield cyclohexanone of a high purity. In commercial operation where the adduct is decomposed in the kettle of a distillation column, the temperature is usually maintained slightly above 93° C., say at 95–100° C. in order to provide a reasonable rate of decomposition and to insure complete decomposition of the adduct.

Therefore, according to this invention, there is provided a process for the recovery of cyclohexanone from a mixture containing it which comprises forming a cyclohexanone-bisulfite adduct and heating the same in presence of water at a temperature of at least about 90° C., and recovering cyclohexanone from the process.

The process of this invention makes feasible the separation of cyclohexanone from mixtures with cyclohexanol, cyclohexane, other alicyclic hydrocarbons and any other organic liquid which is not miscible with aqueous bisulfite solutions. At the point of instability, that is, the temperature where the cyclohexanone-bisulfite adduct breaks down, it is necessary to remove the cyclohexanone from the aqueous bisulfite solution to prevent the reformation of the adduct and the establishment of an equilibrium between the adduct and the components of the adduct. According to the present invention, this removal is effectively carried out in one embodiment by azeotropically distilling overhead cyclohexanone and water. Other methods for removing the cyclohexanone from the adduct can be used.

In the formation of a cyclohexanone-bisulfite adduct to remove the cyclohexanone from a mixture of other hydrocarbons such as are described above, any water soluble bisulfite may be used. Bisulfites of the alkali metals and ammonium and substituted ammonium bisulfites are suitable. Aqueous solutions of these bisulfites containing from ten percent by weight of the bisulfites up to and including saturated bisulfite solutions are suitable for contacting with cyclohexanone to form the bisulfite adduct. Solutions containing a smaller percentage than ten percent can be used but much larger volumes of the contacting solution must be used in this case and much longer reaction times for the formation of the bisulfite adduct result. If saturated solutions of bisulfite are used, a large amount of the bisulfite adduct formed will precipitate out as a solid salt. Similarly, if solutions approaching saturation are used, part of the bisulfite adduct will dissolve in the aqueous bisulfite solution and the remainder of the adduct will precipitate out. If solutions far below saturation are used, the bisulfite adduct will dissolve in the aqueous bisulfite solution. While the theoretical amount of bisulfite needed to react with cyclohexanone to form the bisulfite-adduct is one mol of the bisulfite to one mol of ketone, it is preferred to use an excess of the bisulfite because of the increased reaction rate when the bisulfite is present in excess.

As an example of this process, Figure I, a simplified flow diagram, illustrates the steps necessary in the process of this invention. Through line 8, there is fed into washer 9, a mixture of cyclohexane, cyclohexanol, cyclohexanone, acids, and other oxidation products from a cyclohexane oxidation step. The mixture is washed with caustic, added through line 7, in washer 9, to remove and/or neutralize organic acids which are present and which interfere undeniably with formation of an adduct, until the mixture has a pH of at least 8, and then is fed via line 10 to mixer 11. Spent caustic solution is removed via line 6. Simultaneously, an aqueous solution of sodium bisulfite containing slightly less than the amount necessary for the solution to be saturated, is fed to mixer 11 through line 12. The bisulfite is fed to the mixer in the ratio of two mols of bisulfite to each mol of cyclohexanone present in the mixture being fed through line 10. The cyclohexanone present reacts with the sodium bisulfite to form the bisulfite adduct of cyclohexanone. Since a sodium bisulfite solution approaching saturation is being used, the effluent from mixer 11 contains cyclohexane, cyclohexanol, sodium bisulfite solution containing some dissolved bisulfite adduct of cyclohexanone, and solid bisulfite adduct of cyclohexanone. This effluent is fed via line 13 to filter 14. The solid bisulfite adduct is filtered out at this stage, is then passed via line 15, valve 16 open, to mixer 17. Water is introduced to mixer 17 through line 18 with valve 19 open, and the solid adduct is thus dissolved in water. The filtrate from filter 14, containing cyclohexane, cyclohexonal, and an aqueous solution of sodium bisulfite and cyclohexanone bisulfite adduct, is passed through line 20, valve 21 open and valve 22 shut, to extractor 23. Ether or some other extracting material is introduced to extractor 23 via line 24 with valve 25 open. The extract from 23, containing ether, cyclohexane, and cyclohexanol passes through line 26 to distillation column 27. The extracting material, ether in this example, is withdrawn overhead from 27 and is returned for further extraction. A portion of the ether is returned to the column via line 24a as reflux. The bottoms from 27, cyclohexane and cyclohexanol, are withdrawn through line 28 and returned to the oxidation step after separation of the cyclohexanol. The raffinate from extractor 23, an aqueous solution of sodium bisulfite and cyclohexanone bisulfite adduct, leaves 23 through line 29, valve 30 open. The effluent from mixer 17 and the raffinate from extractor 23 are combined in line 31 and passed to distillation column 32. As the distillation column 32 is operating above 93° C., the cyclohexanone bisulfite adduct breaks down and water and cyclohexanone are azeotropically distilled overhead through line 33 to separator 34. Cyclohexanone is separated from the water in 34 and removed through line 35 to storage, while the water is withdrawn from 34 through line 36 and is thus recycled to the kettle of the distillation column 32. A portion of the cyclohexanone can be returned to the column via line 38 as reflux. Aqueous sodium bisulfite solution is withdrawn from 32 through line 37 for recycle to the adduct formation step after the bisulfite solution is reconcentrated to the desired concentration of sodium bisulfite.

The recycle of water by way of line 36 aids in the recovery of sulfur dioxide which will reform bisulfite as the solution leaving tower 32 cools.

Had a dilute solution of sodium bisulfite been introduced to mixer 11, all of the cyclohexanone bisulfite adduct would have dissolved in the aqueous phase and none of the solid bisulfite adduct would have been present. In this case, the filtration step is eliminated from the process by closing valves 16 and 19, leaving all other valves open with the exception of valve 22 which would remain closed.

In the above embodiments of the invention the temperature of any equipment wherein cyclohexanone bisulfite adduct is present is kept below 93° C. with the exception of distillation column 32, as described.

*Example I*

A run was made in which a batch distillation of cyclohexanone-sodium bisulfite adduct in water was carried out. Two hundred sixty-four grams of sodium bisulfite adduct of cyclohexanone was dissolved in water, and the resulting solution was distilled in a batch distillation vessel. One hundred five grams of cyclohexanone was obtained overhead, representing a yield of 82.5 percent of the theoretical. The kettle temperature was 100° C.

*Example II*

To 95 grams of cyclohexanone was added a saturated solution of sodium bisulfite containing 200 grams of sodium bisulfite. After the reaction was completed and a homogeneous mass resulted, the mixture was placed in a kettle attached to a three-foot, one-inch inside diameter distillation column packed with helix-type packing. The mixture was then heated, but no separation of cyclohexanone from the solution resulted until a temperature of 93° C. was reached. The kettle temperature was raised to 100° C. and distillation was carried out for approximately eleven hours using a reflux ratio of 1:2 and recycling the water which was separated to the kettle. The kettle temperature during the distillation was held constant at 100° C., and the head temperature was constant at 95° C. Ninety-one grams of cyclohexanone was recovered, representing a recovery of 96 percent.

Reasonable variation and modification are possible within the scope of the foregoing disclosure, drawing and the appended claims to the invention, the essence of which is that cyclohexanone is recovered from a mixture containing it, as described, by forming in said mixture a cyclohexanone-bisulfite adduct, in the preferred embodiments, separating substantially all of the remainder of the mixture from the adduct and heating the same at a temperature in excess of at least about 90° C. in the presence of water to recover cyclohexanone, in a preferred embodiment, recovering the cyclohexanone in the form of an azeotrope with water, as described.

We claim:

1. A process for the recovery of cyclohexanone from a mixture containing it which comprises in the presence of water contacting the mixture with a water-soluble bisulfite so as to form a cyclohexanone-bisulfite adduct, then heating the adduct in the presence of water at a temperature of at least about 90° C. thus forming in a single heating step a distillate consisting essentially of a cyclohexanone-water azeotrope and removing and recovering from the process said distillate.

2. A recovery of cyclohexanone according to claim 1 wherein the cyclohexanone is contained in a mixture also containing cyclohexanol, acids and other oxidation products and wherein the bisulfite is a bisulfite of at least one of the alkali metals and ammonium.

3. A process according to claim 2 wherein the bisulfite solution has a concentration in the range of from about ten percent by weight to saturation.

4. A process for the recovery of a substantially pure cyclohexanone which comprises the steps as follow: (a) admixing a mixture containing cyclohexane, cyclohexanol and cyclohexanone with an aqueous solution of a bisulfite to form a cyclohexanone-bisulfite adduct, (b) filtering the reaction mass thus obtained to remove any solid adduct present in said mass, (c) contacting the filtrate with a solvent to extract cyclohexane and cyclohexanol therefrom, (d) combining said solid and the extracted filtrate, (e) adding any water necessary to form a solution which can be subjected to distillation, (f) distilling said solution at a temperature sufficient so as to cause decomposition of the adduct therein, and (g) recovering simultaneously during said distilling as a distillate a cyclohexanone-water azeotrope which is removed and further treated to recover pure cyclohexanone.

5. A process for the recovery of a substantially pure cyclohexanone which comprises the steps as follows: (a) admixing a mixture containing cyclohexane, cyclohexanone and cyclohexanol with an aqueous solution of a bisulfite to form a cyclohexanone-bisulfite adduct containing reaction mass, (b) contacting the reaction mass thus obtained with a solvent so as to extract therefrom cyclohexane and cyclohexanol, (c) distilling the thus extracted solution at a temperature which is sufficient to cause decomposition of the adduct therein contained, and (d) recovering simultaneously during said distilling as a distillate a cyclohexanone-water azeotrope, (e) removing said azeotrope from the process and separating this azeotrope to recover pure cyclohexanone.

6. A process according to claim 5 wherein the concentration of the bisulfite solution is in the range of from about ten weight percent to saturation, the ratio of bisulfite to cyclohexanone is two mols of bisulfite to each of cyclohexanone, and wherein whenever solid phase is present, sufficient water to form a distillable solution is added prior to the distillation.

7. A process according to claim 5 wherein the distillation is effected at a temperature in excess of approximately 93° C.

References Cited in the file of this patent

FOREIGN PATENTS

| | | |
|---|---|---|
| 825,546 | Germany | Dec. 20, 1951 |
| 852,852 | Germany | Oct. 20, 1952 |

OTHER REFERENCES

Fuson et al.: "Organic Chemistry," 2nd edition, John Wiley and Sons, Inc., 1954, pp. 83–84.